Nov. 28, 1967     E. H. CARNEVALE ET AL     3,354,699
ULTRASONIC MEASUREMENT APPARATUS EMPLOYING
A COOLED CYLINDRICAL TRANSDUCER
Original Filed March 10, 1964                    2 Sheets-Sheet 1

INVENTORS
EDMUND H. CARNEVALE
BY LAWRENCE C. LYNNWORTH
Weingarten, Orenbuch & Lakine
ATTORNEYS

United States Patent Office 3,354,699
Patented Nov. 28, 1967

3,354,699
ULTRASONIC MEASUREMENT APPARATUS EMPLOYING A COOLED CYLINDRICAL TRANSDUCER
Edmund H. Carnevale, Beverly, and Lawrence C. Lynnworth, Waltham, Mass., assignors to Parametrics, Inc., Waltham, Mass., a corporation of Massachusetts
Original application Mar. 10, 1964, Ser. No. 350,705, now Patent No. 3,315,520, dated Apr. 25, 1967. Divided and this application Feb. 17, 1967, Ser. No. 616,806
7 Claims. (Cl. 73—67.5)

ABSTRACT OF THE DISCLOSURE

A measurement system for determining ultrasonic transmission characteristics of a material where the measurement system employs a cylindrical ultrasonic transducer. A belt is passed around the cylindrical transducer and around an idler roller which serves both to couple ultrasonic energy between the material and the roller and to transfer heat away from the roller. A cooling element displaced from the cylindrical transducer cools the belt.

---

This application is a division of patent application Serial No. 350,705, filed March 10, 1964, now Patent No. 3,315,520.

This invention relates in general to ultrasonic measurements and more particularly to an apparatus for determining the ultrasonic transmission characteristics of materials at elevated temperatures.

Non-destructive testing techniques have been found to be extremely useful both in analyzing materials for internal characteristics and for determining the characteristics of a processed material while the process is still going on. Various non-destructive testing techniques have been used to determine qualities such as the crystalline structure of a material, the grain size, internal voids and flaws in material and the like. These non-destructive techniques include X-ray diffraction methods, neutron radiography, optical and electrical techniques and ultrasonic measurements.

Ultrasonic measurements on a material can yield information on several qualities since the transmission of ultrasonic waves through material depends upon several factors. Among these factors are the temperature of the material, the grain size, the moduli of elasticity and the continuity of the material itself, that is the presence of voids or flaws. Accordingly, measurement of the transmission characteristics of longitudinal and shear ultrasonic waves through a material provides indications of these characteristics or qualities of the material. There are some characteristics which require measurement of the transmission characteristics of both shear and longitudinal waves. For example, one ultrasonic determination of Young's modulus elasticity requires the measurement of both the longitudinal and shear wave velocities in order to obtain the ratio between the two.

In the past, various techniques have been employed in general for coupling both types of waves to the materials being tested. The techniques for measuring the transmission of shear waves have involved bonding the shear wave crystal to the material being tested or generating a longitudinal wave and utilizing mode conversion at one of the faces of the test material to generate shear waves in the specimen itself. The measurement of the longitudinal wave transmission characteristics of a material has generally been accomplished by coupling the transducer of longitudinal ultrasonic waves to the material to be tested by means of a suitable couplant. The most commonly used couplants have been water, glycerine, lubricating or silicone oils.

These techniques have not, however, been entirely satisfactory in making measurements on materials at high temperatures. Thus, glycerine, water and the other frequently used couplants for longitudinal waves are not entirely suitable for non-destructive testing under continuous operation at elevated temperature. Yet, determination of material characteristics at high temperature is becoming increasingly important. It is desirable to locate and evaluate defects and flaws at their earliest occurrence and in a high temperature process this means determining these characteristics at high temperatures so that the salvaging operation may increase in efficiency and a defective part does not have further work done upon it. In a similar manner problems arise in determining grain characteristics. Since grains are formed at high temperatures, it is apparent that if the measurements are performed at high temperatures then pieces containing irregular grain sizes can be reworked immediately. Additionally, the recognition of improper effects of processing while the process is going on allows the process parameters to be varied so that the material immediately following in the process will achieve the desired characteristics.

It is therefore the primary object of the present invention to provide an apparatus for measuring at high temperature the transmission characteristics of ultrasonic waves in a material.

Other objects and advantages will become apparent from the following description when taken in conjunction with the accompanying drawing in which.

Figure 1:
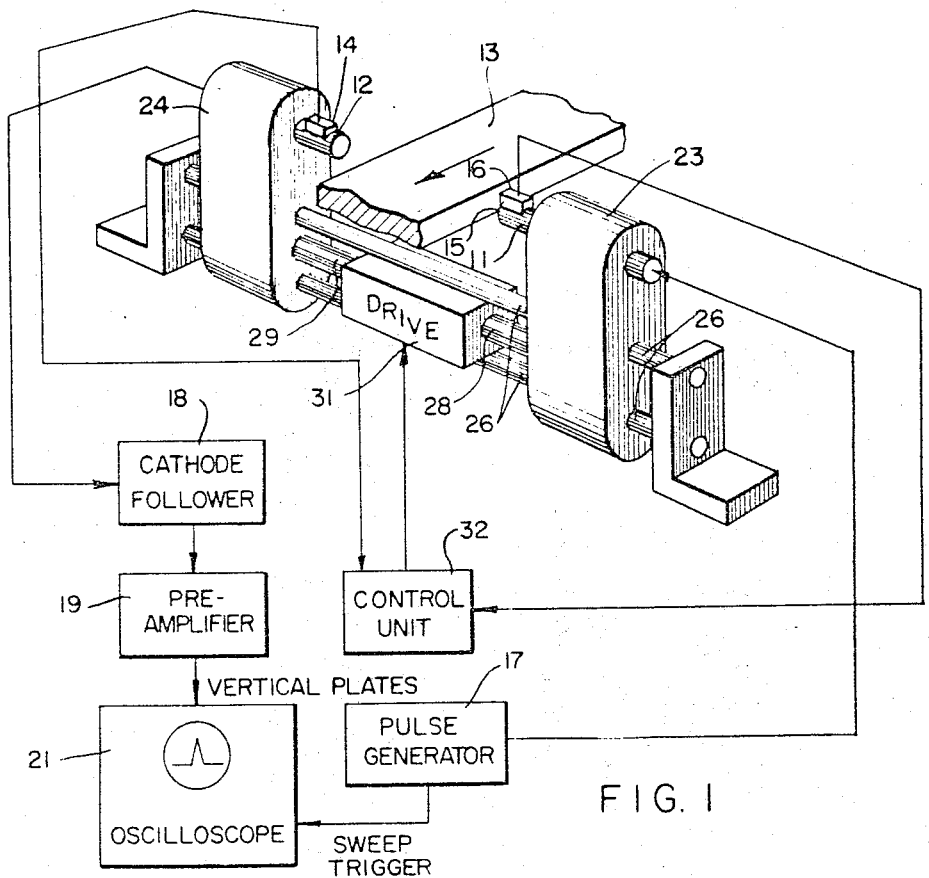
FIG. 1 is an illustration partly in perspective and partly in block diagrammatic form of a measuring apparatus constructed in accordance with the principles of this invention.

Referring now to FIG. 1, an apparatus is shown which is suitable for the measurement of ultrasonic wave transmission in a material to be tested at temperatures in excess of 1000° C. A transmitting ultrasonic probe 11 and a receiving ultrasonic probe 12 are mounted on opposite sides of a material to be tested 13. While the probes 11 and 12 may take several forms, one suitable form consists of an aluminum buffer rod approximately one inch in diameter to which has been bonded an ultrasonic wave generating crystal, such as a barium titanate crystal. In the transmitting probe 11 mounted near the transmitting face 15 of the probe is a thermal-sensing element 16 which provides a signal varying with the temperature at the face of the probe. Electrically connected to the transmitting probe 11 and more particularly to the crystal contained within the probe are pulses from pulse generator 17. These pulses which typically would be in the megacycle frequency range excite the crystal to produce the ultrasonic waves. The receiver probe 12 is constructed substantially the same as the transmitter probe 11, however, it may or may not have a thermal sensing element and in this probe electrical pulses from the internal receiving crystal are connected to a cathode follower 18. The output from cathode follower 18 is coupled through a preamplifier 19 to an oscilloscope 21.

The ultrasonic transmission probe 11 is mounted in a sliding mount 23, which in turn is supported on a pair of bars 26 which extend parallel to the long axis of the transmission probe 11. Also mounted on bars 26 is a second carriage 24 which supports the receiving probe 12. The position of carriages 23 and 24 on the bars 26 is controlled by link members 28 and 29 respectively. The link members are in turn connected to a drive mechanism 31. The drive mechanism 31 operates the link members 28 and 29 either to drive the probes 11 and 12 away from each other and the material to be tested or, conversely, brings them together until they contact the sides of the material 13 in order that the transmission of ultrasonic waves from probe 11 to probe 12 may be measured. The drive mechanism 31 may take any of several completely conventional forms, for example, motor operated or hydraulically operated pistons. The drive mechanism 31 is operated by a control unit 32.

The method of operation of the above-described apparatus is as follows: in order to make a measurement at high temperature, the transmitting and receiving probes must be brought into only momentary contact with the material to be tested, such that any couplant, such as silicone grease on the faces of the probes is not excessively heated and so that the probes themselves are not heated beyond a suitable operating temperature, for example, 100° C. During this momentary contact pulses of ultrasonic waves are transmitted from the transmitting probe 11 through the material to be tested 13 to the receiving probe 12. The time lapse between the generation of the wave at the face 15 of probe 11 and the arrival of this wave at the probe 12 is indicative of the velocity of the wave through the material 13. This velocity is, in turn, directly related to the temperature of the material. In addition, to the extent that acoustic coupling and electronic amplification remain reproducible, the amplitude of the wave received at the probe 12 is proportional to the continuity and grain structure of the material. The crystal within the receiving probe 12 converts the ultrasonic wave received into electrical pulses which, as previously pointed out, are coupled through a cathode follower 18 and preamplifier 19 to the vertical plate of the oscilloscope 21.

The pulse generator 17 provides, at the time when a pulse is generated to produce the ultrasonic wave in the transmitting probe 11, a pulse which triggers the sweep of oscilloscope 21. Thus, the time position along the horizontal ordinate of a pulse on the vertical plate is indicative of the velocity of the ultrasonic wave through the material and hence its temperature, while the amplitude of this pulse is indicative of the quality of the material being tested.

In order to control the time duration of the contact of the probes 12 and 11 with the material to be tested, the control unit 32 may be operated either on a temperature or on a time basis. In one arrangement the temperature sensing element 16 can provide a signal to the control unit 32 indicating the temperature at the face 15 of the transmitting probe 11 and this control unit 32 may operate to withdraw the probe when a preset temperature, for example, 100° C., is achieved at the probe face. The time of contact under usual conditions would be in the order of 1 millisecond and hence the control unit 32 may alternatively be operated to establish a 1 millisecond contact.

Figure 2:
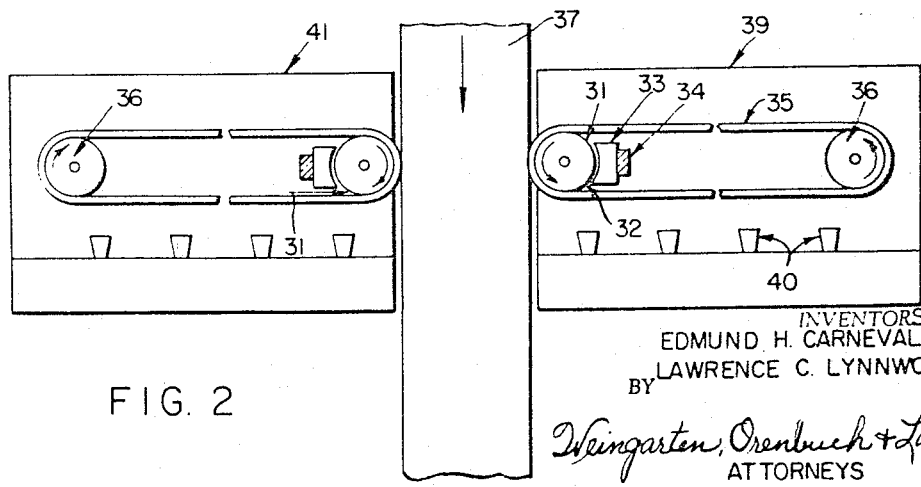
FIG. 2 is an illustration in block diagrammatic form of a preferred embodiment of an apparatus constructed in accordance with the principles of this invention.

Turning now to FIG. 2 a second embodiment of the measuring system for providing a momentary contact measurement of ultrasonic transmission is shown. In the embodiment shown in FIG. 2 the electrical apparatus for measuring the signals from the receiving transducer and for exciting the signals from the generating transducer are not shown. These are, however, completely conventional circuitry, similar to that shown in FIG. 1. In the apparatus of FIG. 2 the stock material 37 to be tested passes between a transmitter unit 41 and a receiver unit 39. The receiver unit 39 includes a pair of rollers 31 and 36 with the roller 31 serving as an acoustic idler which may be formed of fused silica. Stretched around the two idler rollers 31 and 36 is a belt 35 which serves to provide momentary acoustic contact between the stock material 37 and the acoustic idler roller 31. This belt 35 may typically be formed of a silicone rubber, since silicone rubbers have relatively good high temperature characteristics. A piezoelectric crystal 34 is cemented to a shoe 33. Shoe 33 is formed typically of nylon, and has a concave bearing surface adjacent the acoustic idler 31. At the interface between the acoustic idler 31 and the concave inner surface of the shoe 33 a suitable couplant 32, such as silicone grease is maintained to provide acoustical coupling between the shoe 33 and the idler 31. Since this couplant adheres somewhat to the idler 31, it also provides coupling between the idler 31 and the inside of the belt 35. The diameter of the idler 31 and the rotational speed of this idler 31 are arranged so that contact between a particular area of the belt 35 and the hot stock 37 is very brief, for example, in the order of 1 millisecond. The length of the belt 35 is also arranged so that at the rotary speed of the idler 31, each portion of the belt material 35 is sufficiently cooled by cold air blowers 40 before it returns to contact with the stock.

While the transmitter unit 41 has the same physical arrangement as the receiver unit 39, it is electrically connected to generate ultrasonic waves from the piezoelectric crystal, whereas the receiver unit 39 generates an electrical signal when it receives the ultrasonic waves.

The two units, that is, the transmitter and receiver, can be positioned substantially opposite one another in this arrangement. If the velocity of the stock is 100 ft. per second and the stock is 12" wide, then the sound wave generated will be swept less than $\frac{1}{10}$" downstream during its 63 microsecond transit time across the stock, assuming that the stock is 4340 steel at 2000° F., for which the velocity of the longitudinal ultrasonic wave equals 0.19 inch per microsecond.

Figure 3:
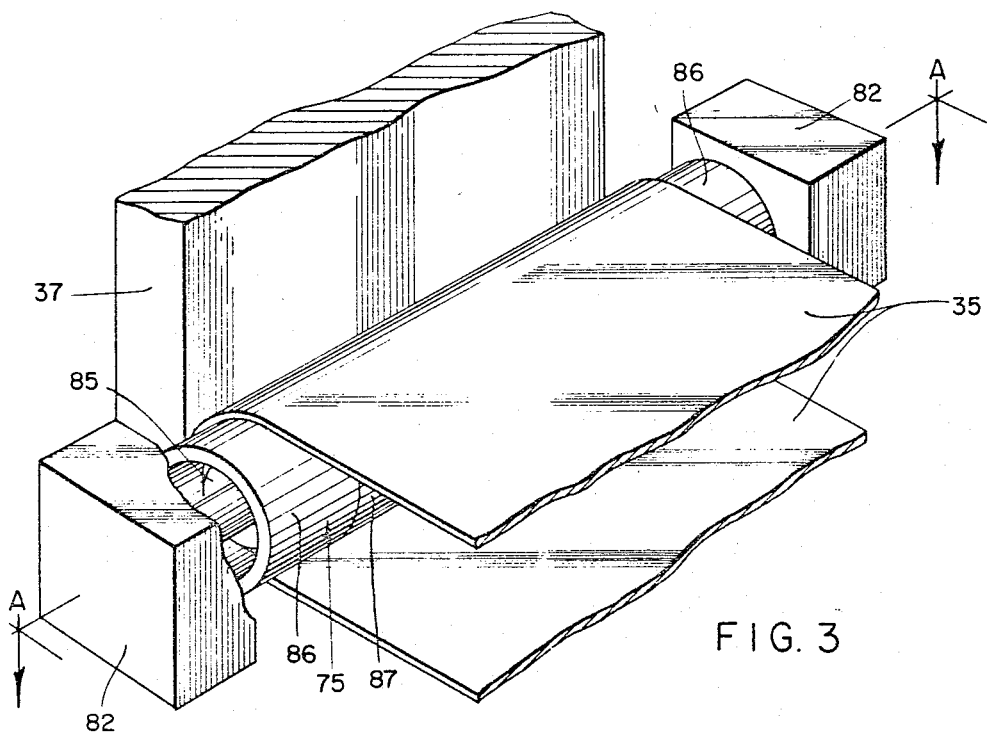
FIG. 3 is an illustration in perspective view of an alternative arrangement of a portion of the apparatus of FIG. 2.
Figure 4:
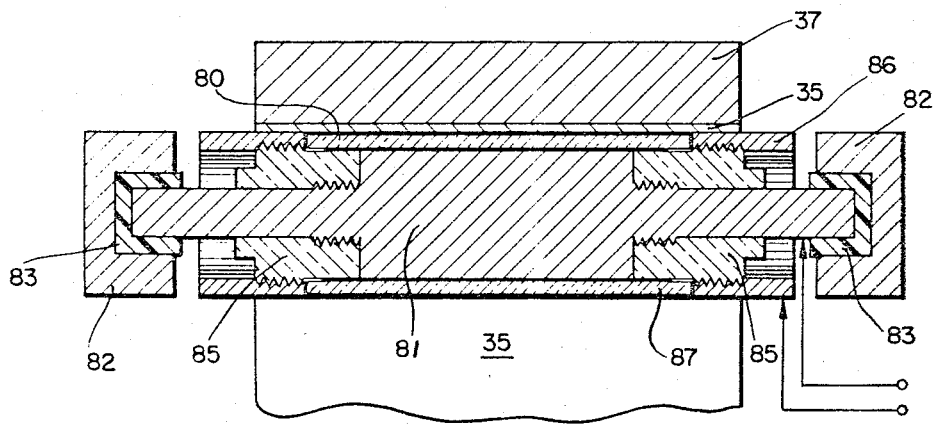
FIG. 4 is a cross-sectional view taken along the line A—A of FIG. 3.

In FIG. 2 the apparatus includes a piezoelectric crystal mounted on a shoe as the exciting source. In FIGS. 3 and 4 an alternative arrangement for the ultrasonic transmitter is illustrated. A tubular piezoelectric ceramic 75 is used in place of the acoustic idler 31 of FIG. 2. This tubular ceramic may be formed as a cylindrical shell of a material such as barium titanate or lead zirconate and would typically have a wall thickness mode, so that when energized it would transmit longitudinal ultrasonic waves through the high temperature material stock 37.

FIG. 4 is a cross-sectional view taken along the line A—A of FIG. 3 and illustrates in more detail the construction of the acoustical transmitting idler 75. A piece of tubular piezoelectric crystal 80 has its inside surface electroplated to within about $\frac{1}{8}$" of either edge. This internal electro-plated surface is mounted on a central conductor 81. The central conductor 81 has a central portion of relatively larger diameter, approximately equal to the internal diameter of the cylindrical crystal and is then stepped down to a smaller diameter and therefore at either end has a reduced diameter portion extending out a pivot axle for the entire idler. Either end of the central conductor 81 is supported in a bearing block 82 within an electrically insulating insert 83. A portion of the central conductor 81 is threaded and has mounted on it at the threaded portion a second insulator 85, to which in turn is mounted an outer conductor 86. This latter outer conductor 86 is formed of an electrically conducting sleeve which is arranged to electrically contact the outer conductor surface 87 of the ceramic insulator. At one end of the idler electrical contacts are arranged to connect independently to the outer conductor 86 and the central conductor 81. Since this must be a rotating connection, the conventional techniques such as carbon brushes or mercury contacts should be employed.

The invention having been described various modifications and improvements will now occur to those skilled in the art and the invention described should be construed as limited only by the spirit and scope of the appended claims.

What is claimed is:

1. Apparatus for measuring the ultrasonic transmission characteristics of a material comprising, transducer means for transmitting and receiving ultrasonic energy, said transducer means providing pulses of ultrasonic energy in response to actuating electrical signals and providing output electrical signals in response to received pulses of ultrasonic energy, said transducer means including a generally cylindrical ultrasonic emitting surface arranged to rotate about the long axis of said cylinder and positioned in proximity to said material to be measured;

circuit means for actuating said transducer means to produce output pulses of ultrasonic energy and for comparing the time of occurrence of output electrical signals from said transducer with said ultrasonic energy pulses;

a belt arranged to travel between said cylindrical surface and a position removed from said cylindrical surface, said belt contacting both said cylindrical surface and said material to be measured for coupling ultrasonic energy between said cylindrical surface and said material to be measured; and cooling means positioned to cool said belt as it travels to maintain the temperature at said cylindrical surface below a predetermined level.

2. Apparatus in accordance with claim 1 and further including a second belt and a second cooling means and wherein said transducer means includes a second cylindrical rotatable surface, said second cylindrical surface and said second belt being positioned so that ultrasonic energy is coupled between said cylindrical surface and said material to be measured at a point removed from the position where said ultrasonic energy is coupled to said material to be measured through said first belt, said second cylindrical surface, said second belt, and said second cooling means being arranged so that said second cooling means cools said second belt to reduce the temperature at said second cylindrical surface below a predetermined level.

3. Apparatus in accordance with claim 2 wherein said first and second cylindrical surfaces are formed as first and second cylindrical roller elements respectively and wherein said transducer means further includes an ultrasonic wave generating crystal acoustically coupled to said first cylindrical roller element and a receiving crystal for providing output electrical signals in response to incident ultrasonic waves, said receiving crystal being acoustically coupled to said second cylindrical roller element.

4. Apparatus in accordance with claim 3 and including first and second idler elements, said first idler element being disposed at said first position removed from said cylindrical surface and said second idler element being disposed at a second position removed a fixed distance from said second cylindrical surface and wherein said first belt is formed as a continuous web stretched around and between said first cylindrical roller and said first idler and is arranged to move longitudinally with rotation of said first roller element, and wherein said second belt is formed as a continuous web placed around and between said second cylindrical and said second idler and arranged to move longitudinally when said second cylindrical roller rotates.

5. Apparatus in accordance with claim 4, wherein each of said belts is formed of silicone rubber.

6. Apparatus in accordance with claim 1, wherein said cylindrical surface is formed as a tubular piezoelectric ceramic, said ceramic being polarized to generate ultrasonic waves.

7. Apparatus in accordance with claim 6 and including an idler element disposed at a first position removed a fixed distance from said cylindrical surface, and wherein said belt is formed as a continuous web stretched around and between said first tubular ceramic and said idler, and is arranged to move longitudinally when said cylindrical surface rotates.

References Cited

UNITED STATES PATENTS 3,074,267    1/1963    Martin _____ 73—67.5

FOREIGN PATENTS 932,523    9/1955    Germany.

RICHARD C. QUEISSER, *Primary Examiner.*

JAMES J. GILL, *Examiner.*

J. P. BEAUCHAMP, *Assistant Examiner.*